Dec. 2, 1969     G. T. R. CAMPBELL ET AL     3,481,295
HULL FORM OF LOW LENGTH/BREADTH RATIO
Filed March 22, 1968     3 Sheets-Sheet 1
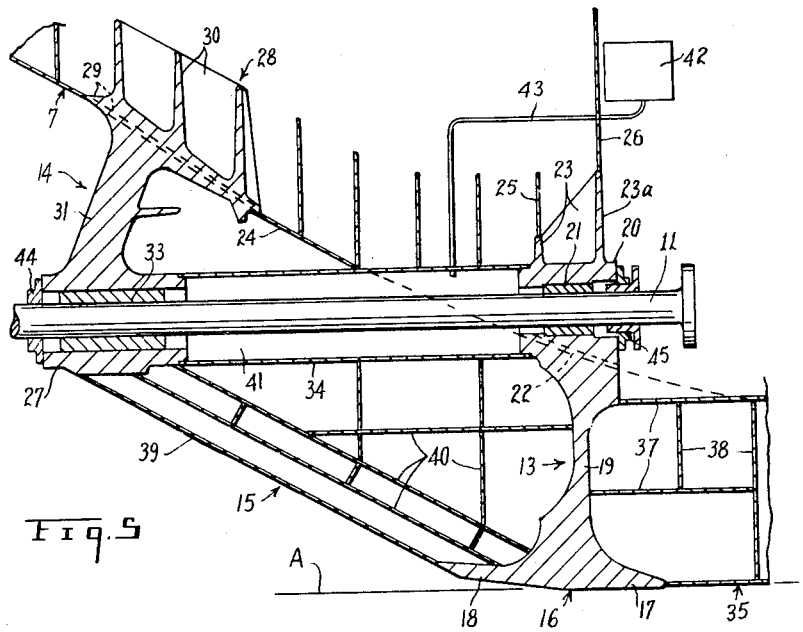
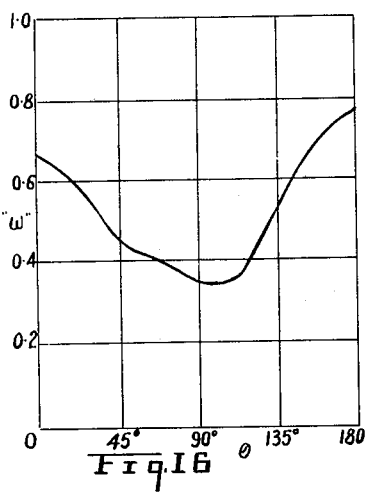
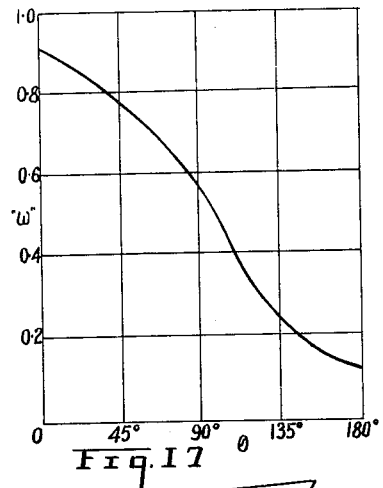
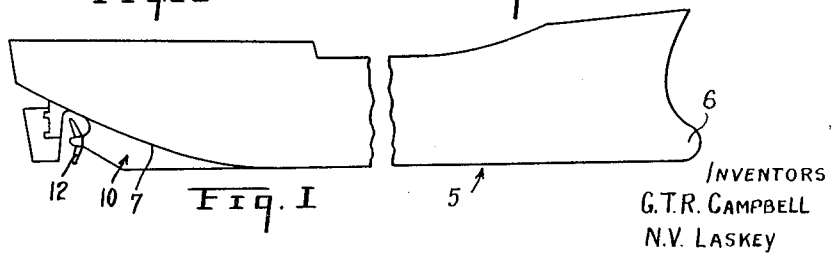
INVENTORS
G.T.R. CAMPBELL
N.V. LASKEY
Fetherstonhaugh & Co.
ATTORNEYS Dec. 2, 1969   G. T. R. CAMPBELL ET AL   3,481,295
HULL FORM OF LOW LENGTH/BREADTH RATIO
Filed March 22, 1968   3 Sheets-Sheet 2
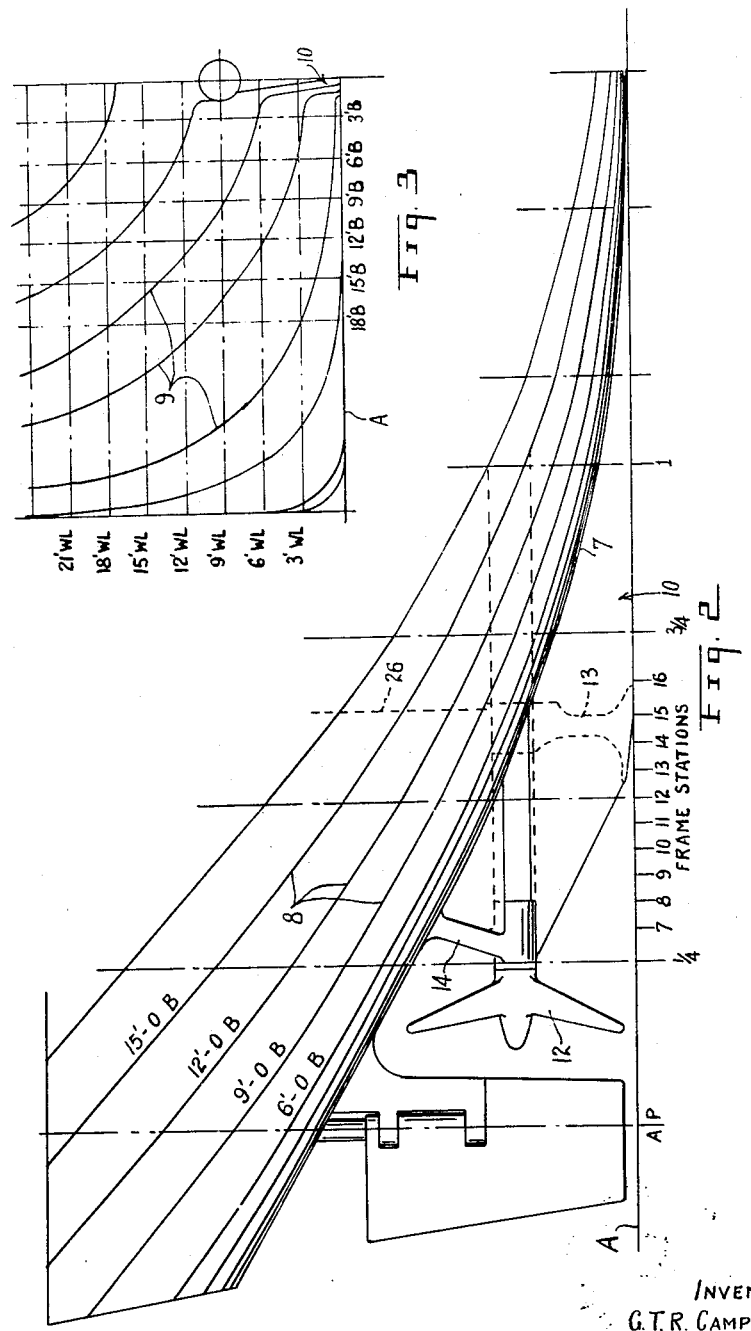
INVENTORS
G.T.R. CAMPBELL
N.V. LASKEY
Fetherstonhaugh & Co.
ATTORNEYS

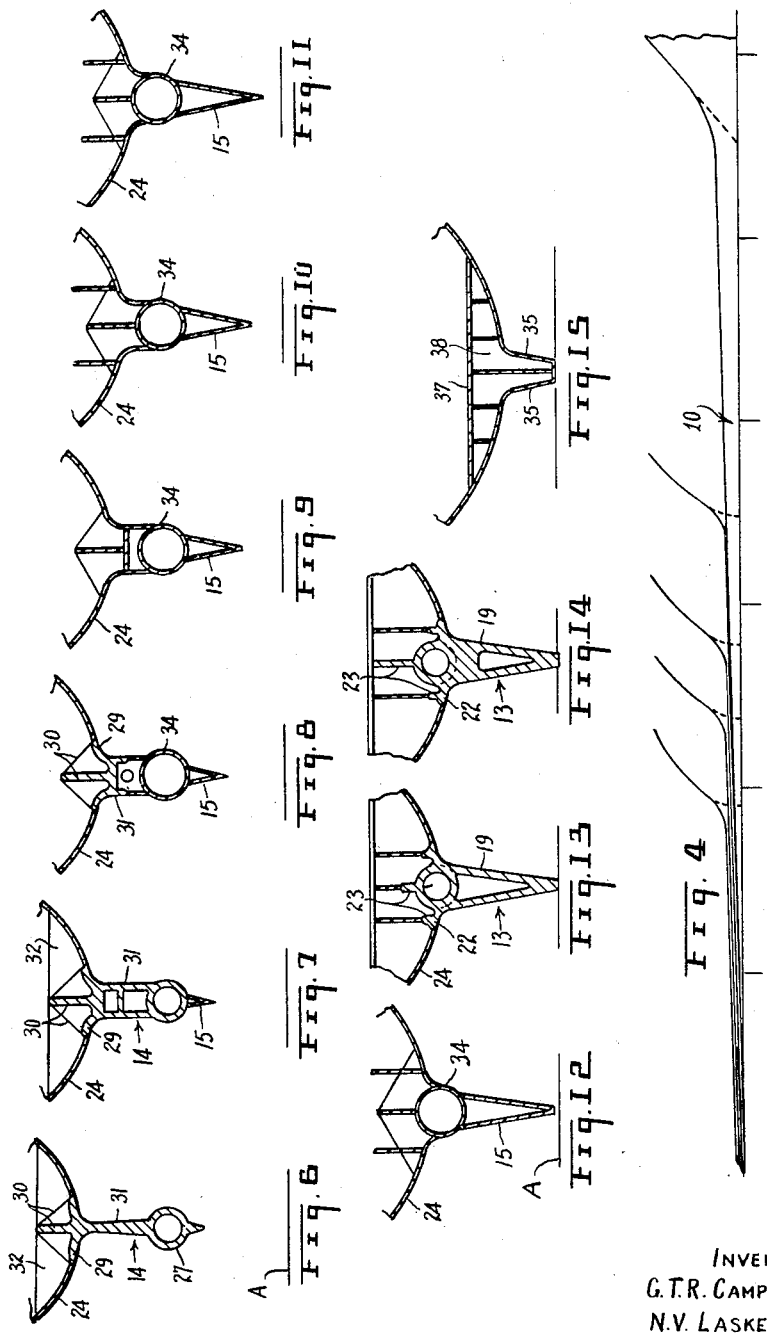

United States Patent Office 3,481,295
Patented Dec. 2, 1969

3,481,295
HULL FORM OF LOW LENGTH/BREADTH RATIO
George T. R. Campbell and Norman V. Lasky, Montreal, Quebec, Canada, assignors, by mesne assignments, to Algoship International Limited, Nassau, Bahamas, a body corporate of the Bahamas
Filed Mar. 22, 1968, Ser. No. 715,210
Int. Cl. B63b 1/08; B63h 5/06
U.S. Cl. 114—57                                    5 Claims

ABSTRACT OF THE DISCLOSURE

A hull form for large single screw vessels having a length/breadth ratio of 6.5:1 and a block coefficient of 0.80 and above. The vessel has a bulb at its fore-foot equal to approximately 10% of the immersed cross sectional area of the hull at mid length. The after end of the vessel having single curvature stern buttock lines extending forward from the stern of the vessel for approximately 19 to 25 percent of the length of the vessel measured along the moulded base line at the centreline and a propeller supporting appendage of narrow V shape in transverse section and tapered in the rearward direction.

This invention relates to the hull form of vessels and particularly to providing a hull form suitable for use in single screw vessels, which is inexpensive to build but is, nevertheless, efficient from a hydrodynamic stand point.

The hull form covered by the present invention is inexpensive to build because the length/breadth ratio is 6.5:1 and below, whereas this ratio in the conventional type of hull is normally above this value. As length is the parameter which controls the cost of a vessel to a large extent, any reduction in length for a given displacement results in a considerable saving in cost. With the relatively short length of the vessel of the present application, it is necessary to increase the breadth and the block coefficient, in order to achieve a comparable displacement to that which would obtain with a hull form of conventional design.

By reducing the length of the vessel, which necessitates increasing the breadth and filling-out of the block coefficient, a very inefficient hull form would result although it would be relatively cheap to construct. This can readily be understood, as a short, wide and full-bodied hull form will be more difficult to propel and steer than would a long, narrow and finelined hull form.

To overcome this, the hull form of the present invention is so arranged as to incorporate a bulb at the fore-foot and removing all double curvature in the after body lines. The large bulb at the fore-foot is designed to reduce wave-making resistance, while the elimination of all double curvature in the after body lines of the hull assist in smoothing out irregularities in the "wake" and also reduces the intensity of the wake. It is the combination of these two features which enables a short, wide and full-bodied hull form to be propelled and steered efficiently.

In order to retain the benefits of eliminating double curvature in the lines of the after body of the vessel, a special design of appendage or skeg, which is economical to construct, is provided to accommodate the propeller shaft, so that it can be passed outboard from the hull for mounting of the propeller at its free end concomitant with a high degree of watertightness and bearing arrangement which will ensure stability of the propeller shaft in rotation at all times.

This appendage includes fore and aft steel castings supported under the after body of the hull in spaced apart relation, each of the castings forming a bearing support for the propeller shaft, and closing in by plating the space between the castings to form an appendage or skeg having a narrow tapered profile both longitudinally and transversely of the vessel.

The primary object of the invention is to provide a hull form whose length/breadth ration is 6.5:1 and below, and in which the block coefficient is 0.80 and above.

A further object of the invention is to eliminate all double curvature in the stern lines of the vessel.

A further object of the invention is to provide an appendage or skeg to the stern lines of the hull of the vessel which will serve to accommodate the propeller shaft without diminishing the effects of the single curvature stern lines of the vessel.

A further object of the invention is to provide a hull form including a large bulb at the fore-foot of the vessel which will assist in smoothing out irregularities in the "wake" and also reduce the intensity of the wake.

A further object of the invention is to provide an appendage or skeg under the stern section of the hull having a narrow tapered section longitudinally and transversely of the hull which will support the propeller and improve the steering qualities of the vessel.

These and other objects of the invention will be apparent from the following specification and the accompanying drawings, in which:

FIG. 1 is a longitudinal elevational outline of a vessel according to the present invention.

FIG. 2 is a profile of the stern of the vessel shown in FIG. 1 showing the appendage for mounting the propeller.

FIG. 3 is a half section of the after body of the vessel taken from the profile stations shown in FIG. 2.

FIG. 4 is a partial half bottom plan view of the appendage and bottom lines of the vessel.

FIG. 5 is an enlarged partial longitudinal section of the appendage and propeller shaft mounting.

FIGS. 6 to 15 inclusive are vertical cross sections of the appendage and propeller shaft mounting at frame stations 7 to 16 inclusive in FIG. 2.

FIG. 16 is a graph showing the results of a wake survey with a vessel having a conventional stern.

FIG. 17 is a graph showing the results of a wake survey of a vessel having the stern lines illustrated in the present application.

Referring to the drawings the vessel 5 has the fore-body lines of its hull form so arranged as to incorporate a bulb 6 at its fore-foot. The area of the bulb 6 at its largest section is equal to about 10% of the immersed cross sectional area of the hull form at mid length. The bulb 6 enables fullness of form at the designed waterline to be reduced, so that the half angle of entrance at this waterline does not exceed 38 degrees, although length breadth ratio of the hull form is 6.5:1 and below and the block coefficient is 0.80 and above. Combined with the bulb 6, all double curvature in the after body lines have been removed.

The large bulb 6 at the fore-foot is designed to reduce wave-making resistance, while the elimination of all double curvature in the after body lines of the hull assist in smoothing out irregularities in the "wake" and also reduce the intensity of the wake. It is the combination of these two features which enables a short, wide and full-bodied hull form to be propelled and steered efficiently.

The line of after cut-up 7 on the longitudinal center line of the vessel and the buttock lines 8 all have a single curvature from the stern of the vessel to a point forward approximately 19% to 25% of the length of the vessel measured at the moulded base line A.

The transverse section lines 9 taken from the profile stations represented by the vertical chain-dot lines in FIG. 2 all have a single curvature except where they are flaired into the appendage 10.

In order to retain the benefits of eliminating double curvature lines in the after body of the vessel a special design of appendage or skeg 10, which is economical to construct, is provided to accommodate the propeller shaft 11, so that it can be passed outboard from the hull for mounting of the propeller 12 at its free end concomitant with a high degree of watertightness and a bearing arrangement which will ensure stability of the propeller shaft 11 in rotation at all times.

The appendage or skeg 10 is illustrated in detail in FIGS. 5 to 15 inclusive and consists of a forward steel casting 13 located longitudinally of the vessel at a point approximately where the centerline of the propeller shaft 11 passes through the line of after cut-up 7, an after steel casting 14, and a fabricated steel diagonal tie structure 15 extending from the forward casting 13 along the moulded base line A to the point where the line of after cut-up 7 meets the molded base line, and extending aft between the castings 13 and 14.

The forward casting 13 has a foot portion 16 whose forward end 17 is flush with the moulded base line A and whose after end 18 is inclined upwardly at a slight angle to the base line. The foot portion 16 is of narrow width at the base line A (FIGS. 5, 13 and 14) and is tapered upwardly and outwardly at 19 in the shape of a V to merge with the boss 20 which forms the forward bearing support for the propeller shaft 11 and its bearing 21.

The boss 20 is provided with horizontal and vertical palms 22 and 23 respectively so that they can be securely attached by rivets or by welding to the shell plating 24 and to the deep transverse structural members 25 of the hull in way of the after cutup. The forward vertical palm 23a projecting upwardly from the boss 20 is in line with and connected to the transverse watertight bulkhead 26. The horizontal palms 22 are angled to coincide with the line of after cut-up 7.

The steel casting 13 is designed to support the overhanging weight of the stern of the vessel when the vessel is in drydock.

The after casting 14 has a lower boss 27 and an upper portion 28 composed of horizontal palms 29 and vertical palms 30, the boss 27 and upper portion 28 being connected by a web member 31. The horizontal palms 29 and vertical palms 30 are attached by rivets or welding to the shell plating 24 and to the transverse structural members 32.

The steel casting 14 is designed to support the overhanging weight of the propeller 12 and its boss 27 forms the after bearing support for the propeller shaft 11 and its bearing 33.

A tubular sleeve 34 is axially aligined with the horizontal axes of the bosses 20 and 27 in the castings 13 and 14 and is welded to the bosses at its forward and after ends.

The section 35 of the appendage 10 forward of the casting 13 between the moulded base line A and the shell 24 of the hull is closed in by steel plating 36 and is braced by the longitudinal stringers 37 and transverse structural members 38.

The diagonal structural member 15 between the castings 13 and 14 is V shaped. This V shaped structural member 15 is angled upwards from its lower edge 39 from the after end 18 of the foot of the casting 13 to the boss 27 of the casting 14, and is internally braced, both longitudinally and transversely by steel plate ribs 40.

The annular space 41 formed by the inside diameter of the tube 34 and the outside diameter of the propeller shaft 11 is filled with oil and is connected to a header tank 42, mounted on the bulkhead 26 by means of the tube 43. The outboard end of the boss 27 is sealed by the rotary seal 44 while the inboard end of the boss 20 is sealed by the rotary seal 45.

As will be seen from FIGS. 3, 4 and 6 to 15, the geometry of the steel castings 13 and 14 and the diagonal tie, structure 15 in association with the tube 34 and the forward section 35 of the appendage 10 is so arranged as to present a long, tapered, profile in any horizontal plane as particularly shown in FIG. 4, ensures that, regardless of the fact that the hull is short, wide and full, as denoted by a length/breadth ratio of 6.5:1 and below and a block coefficient of 0.80 and over, good steering qualities will obtain.

Referring to FIGS. 16 and 17. The adoption of body sections in the stern of the vessel, without double curvature, is beneficial from a self-propulsion standpoint, as all large irregularities in the pattern of the "wake" are minimized, and so is its intensity. It makes for a considerable economy in construction, besides eliminating the possibility of exciting vibration at the stern, which is very often the case with a conventional type of stern owing to pressure pulsations set up by the propeller as it is operated in a disturbed "wake."

The elimination of double curvature at the stern combined with the novel construction of the appendage ensures that the flow of water to the propeller is relatively unrestricted.

On FIG. 17 there is shown measured values of wake distribution for a model with the type of stern described above, recorded at a location 0.7 times the radius of the propeller measured from the propeller shaft centre in way of the position at which the propeller is located.

On FIG. 16 is shown a wake distribution recorded in a similar manner and at precisely the same location for a model with a conventional stern.

By comparing the two records of irregularities in wake distribution shown in FIGS. 16 and 17, which obtain with a conventional and the new design of stern, it will be apparent that the incident of propeller excited hull vibration being excited in the hull with the new design of stern is very remote.

It will be noted that the propeller tube 34 is to a great extent located externally of the hull and, due to the construction of the appendage 10 particularly between the forward and after castings 13 and 14, the tube is in direct contact with the water in which the hull is immersed. This results in direct cooling of the oil within the tube with the result that the need for an oil cooler is eliminated which is normally required when white metal lined oil lubricated bearings are employed for the propeller shaft.

What we claim is:

1. A stern design for vessels having a single propeller in which the hull of the vessel has a length/breadth ratio of not more than 6.5:1, and a block coefficient of not less than 0.80, the hull form of the vessel having single curvature stern buttock lines extending from the stern of the vessel for approximately 19% to 25% of the length of the vessel measured along the moulded base line at the longitudinal centreline, a propeller supporting appendage below the stern of the vessel on the longitudinal centreline, the said appendage having a narrow V shape in transverse section and tapered in the rearward direction and includes a forward casting having a bearing boss located in way of the shell of the vessel and having its lower end flush with the moulded base line of the vessel, an after casting suspended downwards from the shell of the vessel and terminating in a bearing boss axially aligned with the boss in the forward casting, and a propeller tube axially aligned with and secured to the opposing faces of the bosses of the said forward and after castings, the said V shaped appendage having its lower edge inclined at an angle between the lower end of said forward casting and the boss of said after casting, and a propeller shaft located within the said appendage and projecting rearwardly therefrom, and a propeller mounted on the rearwardly projecting end of the said propeller shaft.

2. A stern design for vessels as set forth in claim 1 in which the said forward casting is V shaped in transverse section below its boss and the sides of the V shaped portion of the casting are in the same plane as the longitudinal tapered sides of the appendage.

3. A stern design for vessels as set forth in claim 1 in which the upper ends of the said forward and after castings have horizontal palms angled to the contour of the after cut-up of the shell of the vessel, and vertical longitudinal and transverse palms, the said palms being secured to the shell and internal structural members of the vessel.

4. A stern design for vessels as set forth in claim 1 in which that portion of the appendage between the foot of the forward casting and the boss of the after casting is a diagonal structure internally reinforced to support the after casting and the overhung stern of the vessel.

5. A stern design for vessels as set forth in claim 1 in which the said propeller tube is an oil reservoir whose outer surface is exposed to the cooling effect of the water surrounding the appendage of the vessel.

References Cited

UNITED STATES PATENTS

| | | | |
|---|---|---|---|
| 2,564,560 | 8/1951 | Carlotti | 114—57 |

FOREIGN PATENTS

| | | |
|---|---|---|
| 370,053 | 2/1923 | Germany. |
| 1,098,144 | 1/1968 | Great Britain. |
| 1,410,109 | 7/1965 | France. |

OTHER REFERENCES

Principles of Naval Architecture, by Russell & Chapman, vol. II, pp. 102–106, 1949, published by the Society of Naval Architects & Marine Engrs., New York, N.Y.

ANDREW H. FARRELL, Primary Examiner